Dec. 1, 1959  V. MATERESE  2,915,619
ILLUMINATED BAGGAGE RACK
Filed July 8, 1955  2 Sheets-Sheet 1
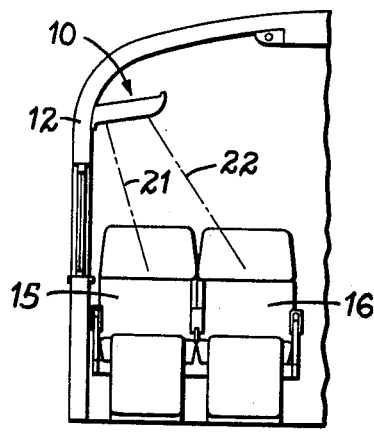
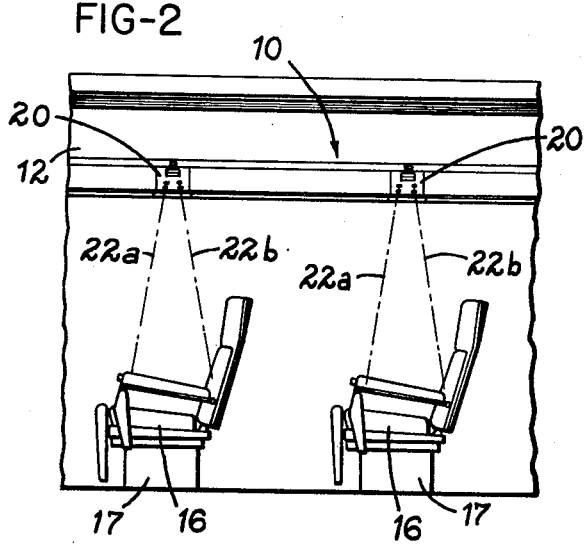
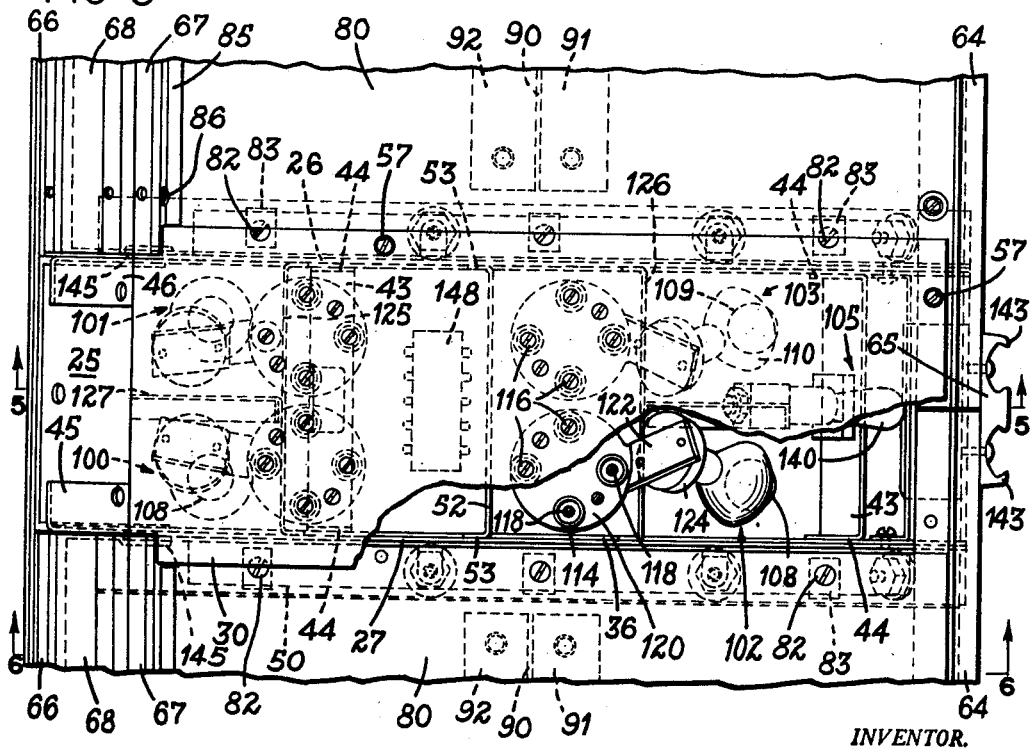
INVENTOR.
VINCENT MATERESE
BY
*Marechal, Biebel, French & Bugg*
ATTORNEYS Dec. 1, 1959   V. MATERESE   2,915,619
ILLUMINATED BAGGAGE RACK
Filed July 8, 1955   2 Sheets-Sheet 2
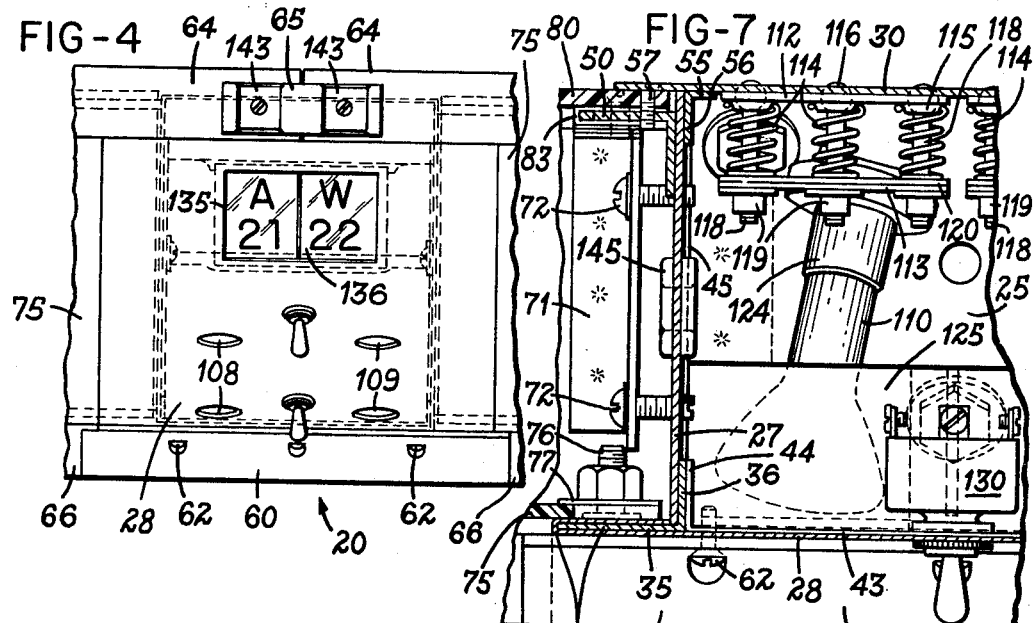
INVENTOR.
VINCENT MATERESE
BY
Marshal, Biebel, French & Bigg
ATTORNEYS United States Patent Office 2,915,619
Patented Dec. 1, 1959

2,915,619

ILLUMINATED BAGGAGE RACK

Vincent Materese, Dayton, Ohio, assignor to Mink-Dayton, Inc., Dayton, Ohio, a corporation of Ohio Application July 8, 1955, Serial No. 520,827

2 Claims. (Cl. 240—7.35)

This application relates to a baggage rack for use in large transportation vehicles such as railroad cars, buses and the like.

A primary object of this invention is to provide a bagage rack which is fabricated from materials which are relatively strong, yet lightweight and inexpensive, which are easy to work with and assemble, and which combine a high quality outward appearance with excellent resistance to wear and abrasion.

Another object of the invention is to provide such a baggage rack which includes a completely enclosed structure having a modern and streamlined outward appearance, in keeping with the modern design of the vehicles within which the rack is intended to be used, and which also forms a housing for electrical lighting equipment to be aligned with the seats of the vehicle, with an individual light for each seat.

A further object of the invention is to provide a baggage rack with such lighting equipment wherein adjustable mounting means are included for the lighting equipment to provide for proper alignment of each electric light with respect to its associated seat.

An additional object of the present invention is to provide a completely enclosed baggage rack structure which houses electrical lighting equipment for the individual seats of the vehicle, and which also forms an enclosed conduit between the various elements of the lighting equipment to house the electrical supply wiring.

Other objects and advantages of the invention will be apparent from the following description, the accompanying drawings and the appended claims.

In the drawings—

Fig. 1 is a partial transverse section through a vehicle incorporating the baggage rack of this invention;

Fig. 2 is a partial longitudinal section looking from the right of Fig. 1;

Fig. 3 is a plan view on an enlarged scale of a portion of the baggage rack seen in Figs. 1 and 2;

Fig. 4 is an end view looking from the right side of Fig. 3;

Fig. 5 is a section taken on line 5—5 of Fig. 3;

Fig. 6 is a section taken on line 6—6 of Fig. 3; and

Fig. 7 is an enlarged partial section taken on line 7—7 of Fig. 5.

Referring to the drawings, which illustrate a preferred embodiment of the present invention, and particularly to Figs. 1 and 2, a baggage rack provided by the present invention is indicated generally at 10 as mounted along the upper side wall 12 of a large transportation vehicle, for example a railroad car. Arranged longitudinally within the vehicle are pairs of seats 15 and 16 which are preferably carried on reversible mountings 17 to provide for facing the seats toward either end of the vehicle. The baggage rack includes cantilever brackets 20 fixed to side walls 12 above each pair of seats, and within these brackets is housed electrical light equipment for each seat, adapted to direct a beam of light along center lines 21 and 22 to the respective seats 15 and 16.

In the embodiment shown, wherein the seats are reversible, two lights are provided for each seat 15 and 16, as indicated by the separate center lines 22a and 22b, in Fig. 2, and one or the other of the lights directed along these lines is used depending upon the position of the seat. The same arrangement is provided for the inner seat 15, so each bracket member 20 houses four separate lights in all.

The brakets 20 provide the supporting structure for the entire baggage rack, as well as housing the lighting equipment for the seats. Each bracket member 20 is fabricated from sheet material, such as relatively light gauge sheet metal, to include a rear wall 25, side walls 26 and 27, and a bottom wall 28 including an integral upwardly curved front portion providing a front wall 29. A removable cover 30 is attached to the top of each bracket member to complete the enclosure.

Referring to Fig. 7, the rear, side and front walls are joined as follows. An angle member 35 has its upright leg 36 welded or otherwise secured to the inner side of side wall 27. The end portion 38 of bottom wall 28 is curled over the horizontal leg of angle 35 and secured thereto, thus completing the joint between the lower edge of the side wall and the bottom wall. The same construction is employed on both sides of the bracket, and therefore in Fig. 5 the angle 40 is seen to have its upright portion welded to the lower edge of side wall 26, and the horizontal leg of angle 40 is attached to bottom wall 28 in the same manner as the joint between that wall and angle 35. A curved angle piece 42 is affixed in the same manner as angles 35 and 40 between side wall 26 and the front wall portion 29, and strap members 43 extend across bottom 28 with upturned end portions 44 fixed to angles 35 and 40. Rear wall 25 is secured to the side walls by angle members 45 and 46, one leg of each of which is welded to the back surface of rear wall 25, and the other legs of which are welded to the respective inner faces of side walls 26 and 27. Angle members 50 extend below the upper edge of side walls 26 and 27, with one leg of each angle 50 fixed to the outer face of the adjacent side wall and the other leg extending laterally and parallel to the upper edge of the side wall. A cross brace 52 extends across the central portion of the bracket and includes end portions 53 which are welded to the inner faces of the opposite side walls 26 and 27 to give further rigidity to the bracket members. The above described bracket enclosure is secured to vehicle side wall 12 by mounting bolts 54.

Cover 30 is provided with a pair of aligning angles 55 welded to its lower face, with the depending legs 56 of these angles spaced to fit within walls 26 and 27. The covers are removably secured to the bracket by screws 57 threading into angle members 50. Finally, base members 60 are secured to the bottom rear corner of the bracket by straps 61 and screws 62, and, at the upper front corner of the bracket, slotted rail members 64 are suitably secured to the bracket in abutting relation to each other and extend outwardly therefrom along the length of the vehicle. These rail members are preferably aluminum extrusions of such length as to extend between adjacent brackets, as shown in Fig. 2, and the butt joint between successive rails 64 is covered by a cap member 65.

Similar rail members 66 and 67 extend between adjacent brackets at the lower rear and upper rear corners, respectively. A back wall plate 68 fits between rails 66 and 67, and the entire assembly of these three members is fastened to wall 12 by screws 69 (Fig. 6) spaced along the length of the plate 68.

At the ends of plate 68 are secured angle members 71, and bolts 72 pass through the forwardly extending leg of these angle members into threaded engagement with suitable threaded apertures at the rear of side walls 26 and 27. Thus, at the sides of each bracket member the laterally extending legs of angle members 35, 40, 42 and 52 provide flanges for attachment and support of the rack structure between the adjacent brackets.

This structure, seen in Figs. 4 and 5, includes a plate member 75 curved in cross-section to conform to the upwardly and forwardly curved configuration of the integral lower and front wall member 28—29 of the brackets. The ends of plate member 75 are slotted at spaced intervals to receive bolt and nut fasteners 76, the bolt heads of which are suitably attached to the horizontal legs of angles 35 and 40, beneath the folded-over edges of bottom wall 28. Each fastener 76 includes a large washer 77 which overlies the slots in plate 75 and provides for clamping action of the fastener to retain the ends of plate 75 on the lower and front flanges. In addition, the front edge of plate 75 is slotted to receive screws 78 which extend through slotted rail 64 and hold the front edge of plate 75 within the slot, as shown in Fig. 6. The plate 75 may be of any suitable laminated board material. For example, suitable results have been obtained with a heavy flexible grade of Formica.

The top of the rack, which provides the shelf for carrying baggage, is provided by plates 80 of tempered hard board material, which are supported at their edges by the horizontal legs of angles 52 and by inwardly extending portions of rails 64 and 67. The front edge of cover plate 80 is secured by screws 81 which thread directly into rail 64. The ends of plate 80 are secured to angles 52 by screws 82 which thread into suitable attaching clips 83 (Fig. 7), for example clips known commercially as Tinnerman clips. The rear edge of plate 80 is clamped to rail 67 by a generally U-shaped strip 85, attached by screws 86 to rail 67. The lower leg of strip 85 clamps the rear edge of plate 80 to the rail, and the rear edge of plate 75 is fastened in the same way to lower rear rail members 66, as indicated by like reference numerals.

A central, generally Z-shaped bracing member 90 extends longitudinally of the rack between plate 75 and cover plate 80, and the upper leg 91 of brace member 90 is attached by screws directly to cover plate 80. The lower leg 92 is secured by screws into a strip of material 94 which is bonded or otherwise suitably secured to plate 75. Thus, the cover plates 80 provide a shelf for storage of baggage and the like which extends above the seats along the upper side wall of the vehicle and brackets 20, together with the rail members 60, 64 and 67 and the plate member 75, provide a fabricated supporting structure for the shelf.

As previously mentioned, each of the brackets 20 contains electrical lighting equipment for the pair of seats located beneath each bracket. In accordance with the invention this equipment is suspended from the covers 30 to provide for ease of installation and servicing. Referring to Fig. 3, four electrical lights are housed within each bracket 20, two for each seat 15 and 16, respectively. These lights are indicated generally as the inner forward and rear lights 100 and 101 and the outer forward and rear lights 102 and 103, respectively. In addition, a seat marker light 105 is suspended from cover 30 to illuminate appropriate identifying markers in the front wall of the bracket, as will presently be described. In lower wall 28 of the bracket, beneath each of the lights 100—103, is a suitable light transmitting portion shown as apertures 108 and 109 in Fig. 4. Bulbs 110, preferably of the reflector type designed to project a concentrated beam of light, are included in each light, and each of the lights 100—103 has an identical adjustable mounting for aligning this light beam with the associated light transmitting portion in the lower wall of the bracket to provide a reading light for the occupant of the seat below.

Referring to Fig. 7, one of the adjustable mountings is shown in detail as including a pair of plates 112 and 113 separated by four springs 114. The uppermost plate 112 is secured, as by screws, against the under surface of cover 30 and includes cup shaped portions 115 for receiving the ball heads 116 of adjusting screws 118 which extend through springs 114 and into nuts 119 below the lower plate 113. A socket mounting plate 120 fits between the bottom of springs 114 and lower plate 113 and includes an integral outwardly curving arm 122 (Fig. 5) to which an electric socket 124 is affixed, facing downwardly toward one of the apertures 108 or 109, respectively, and the arms 122 are bent to align the axis of socket 124 and the bulb 110 received therein generally with the associated aperture 108 or 109. The final alignment of bulb 110 with an aperture in the bracket is accomplished by tightening or loosening one of the adjusting screws 118 to raise or lower the periphery of lower plate 113 and mounting plate 120 as required to properly align the light.

Beneath lights 100—103 are partitions to shield any stray light from an adjacent bulb 110 from shining through another aperture. These partitions include transverse baffles 125 and 126 which are suitably welded at their opposite ends to side walls 26 and 27, and at their bottoms to bracket bottom 28, to provide further stiffening of the brackets in addition to their light baffling function. Short separating baffles 127 and 128 extend longitudinally of the brackets between apertures 108 and 109 and at right angles to the baffles 125 and 126, thus confining the light from each bulb to its respective aperture.

For the pair of lights 100 and 101 there is provided a control switch 130 of the single-pole double-throw type having a central Off position and On position on both sides of the Off position. The switch is suitably wired to the lights 100 and 101 to energize one or the other of them at one or the other On positions of the switch. In like manner, a control switch 132 is provided for the other lights 102 and 103. Each of these switches is mounted in an aperture through strap members 43, with the switch operating arm extending through bottom wall 28, as shown in Fig. 4. Thus, the occupant of the inner seat 15 may operate the necessary light 100 or 101, depending upon which way the seat is facing, through switch 130, and the occupant of outer or aisle seat 16 can control the lights 102 and 103 in the same way through switch 132.

In front wall 29 of each bracket there is provided an aperture 135 across which a suitable translucent plate 136 is mounted, by clips 137. Plate 136 carries identifying marks for the seats located beneath the bracket 20, for example, in Fig. 4 the plate is marked to indicate the aisle seat as No. 21 (seat 16 in Fig. 1) and the window seat as No. 22 (seat 15). Behind plate 136 a small bulb 140 is suspended from a socket 141, which is in turn attached to a mounting arm 142 fixed to cover 30. Ticket holding members 143 are provided on the face of cap 65, vertically aligned with the seating marking indicia.

The present invention provides a convenient wiring conduit for the electrical supply system to the lighting equipment in each bracket 20, thereby eliminating the need for separate wiring conduits in the walls of the vehicle. For this purpose, side walls 26 and 27 of each bracket are provided with suitable apertures defined by grommets 145 through which the electrical wiring 146 may pass, as shown in Fig. 5. This wiring extends within the hollow housing between adjacent brackets provided by the plate 75 and cover plate 80, and is attached in each bracket to a terminal plate 148 mounted on the under surface of cover 30. From each terminal plate 146 suitable wiring, which is not shown for purposes of clarity in the drawings, extends to the four lights 100—103, two switches 130 and 132, and to marker light 105.

The present invention thereby provides a baggage rack which is fabricated of lightweight and relatively inexpensive materials, and which provides a smooth, streamlined, modern appearance which blends with the modern design of such vehicles. The present invention also provides a novel lighting arrangement which is housed wholly within the baggage rack, which includes an individual light for every seat in the vehicle, illuminated identifying numerals for the seats, and provides for easy accessibility to all the electrical equipment for servicing purposes.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A combination baggage rack and light fixture particularly adapted for installation in vehicles, comprising a plurality of hollow bracket members each including front, rear, side and bottom walls, said front and bottom walls being contoured to present a continuous surface curved at the juncture thereof, means on said rear walls adapted for mounting said bracket members in cantilevered fashion upon a wall surface in spaced relation to each other, light transmitting portions in said bottom wall of each said bracket member, a cover for each said bracket member, electrical lighting equipment mounted on the under surface of each said cover for suspension in an associated bracket member and including light beam projecting means, means operable from the exterior of said bracket members for aligning said lighting equipment with said light transmitting portions to illuminate areas beneath said light transmitting portions, front rail members connected to the upper front corners of said bracket members and extending across the space between adjacent said bracket members, rear rail members extending between both the upper and lower rear corners of adjacent said bracket members and including means for attaching said rear rail members to the wall surface, connecting plates extending between adjacent said bracket members and contoured to conform to the contoured configuration of said bracket member bottom and front walls, means securing the edges of said connecting plates to the lower and front sides of said bracket members and to said front rail and said lower rear rail to define enclosed spaces between said bracket members of substantially the same cross-section front to rear as said bracket members, and cover plates extending between said front rail and said upper rear rail and substantially coplanar with said bracket member covers to provide therewith a baggage supporting shelf at the top of said rack to enclose substantially all of the space between adjacent bracket members, and means removably connecting said cover plates to said bracket members and to said front and upper rear rails providing for removal of said cover plates to gain access to the space between said bracket members.

2. A combination baggage rack and light fixture particularly adapted for installation in vehicles, comprising a plurality of hollow bracket members each including front, rear, side and bottom walls, said front and bottom walls being contoured to present a continuous surface curved at the juncture thereof, means on said rear walls adapted for mounting said bracket members in cantilevered fashion upon a wall surface in spaced relation to each other, light transmitting portions in said bottom wall of each said bracket member, a cover for each said bracket member, electrical lighting equipment mounted on the under surface of each said cover for suspension in an associated bracket member and including light beam projecting means, front rail members connected to the upper front corners of said bracket members and extending across the space between adjacent said bracket members, rear rail members extending between both the upper and lower rear corners of adjacent said bracket members and including means for attaching said rear rail members to the wall surface, connecting plates extending between adjacent said bracket members and contoured to conform to the contoured configuration of said bracket member bottom and front walls, means securing the edges of said connecting plates to the lower and front sides of said bracket members and to said front rail and said lower rear rail to define enclosed spaces between said bracket members of substantially the same cross-section front to rear as said bracket members, and cover plates extending between said front rail and said upper rear rail and substantially coplanar with said bracket member covers to provide therewith a baggage supporting shelf at the top of said rack to enclose substantially all of the space between adjacent bracket members, and means removably connecting said cover plates to said bracket members and to said front and upper rear rails providing for removal of said cover plates to gain access to the space between said bracket members.

References Cited in the file of this patent

UNITED STATES PATENTS

| | | |
|---|---|---|
| 927,235 | Hamm | July 6, 1909 |
| 999,368 | Hamm | Aug. 1, 1911 |
| 2,091,599 | Larson et al. | Aug. 31, 1937 |
| 2,185,078 | Hagerty et al. | Dec. 26, 1939 |
| 2,238,847 | Dreyfuss | Apr. 15, 1941 |
| 2,250,619 | Austin | July 29, 1941 |
| 2,251,050 | Hagerty et al. | July 29, 1941 |
| 2,264,637 | Landell | Dec. 2, 1941 |
| 2,284,356 | Arenberg | May 26, 1942 |
| 2,539,321 | Phillips | Jan. 23, 1951 |
| 2,541,864 | Eksergian | Feb. 13, 1951 |
| 2,541,898 | Watter | Feb. 13, 1951 |
| 2,582,738 | Arenberg | Jan. 15, 1952 |
| 2,597,595 | Ordas | May 20, 1952 |
| 2,622,189 | Rahn | Dec. 16, 1952 |
| 2,747,745 | Sontheim | May 29, 1956 |